United States Patent [19]

Niedospial et al.

[11] Patent Number: 4,763,346
[45] Date of Patent: Aug. 9, 1988

[54] PHOTOGRAPHIC CASSETTE AND METHOD OF DISPENSING

[75] Inventors: John J. Niedospial; Bruce R. Muller, both of Rochester, N.Y.

[73] Assignee: Eastman Kodak Company, Rochester, N.Y.

[21] Appl. No.: 879,245

[22] Filed: Jun. 27, 1986

[51] Int. Cl.$^4$ .............................................. G03B 17/26
[52] U.S. Cl. .................................. 378/187; 378/182; 378/184
[58] Field of Search ....................... 378/187, 182, 184

[56] References Cited

U.S. PATENT DOCUMENTS

| | | | |
|---|---|---|---|
| 1,933,652 | 11/1933 | Boldingh | 378/182 |
| 2,566,266 | 8/1951 | Uhle et al. | 378/187 |
| 3,784,835 | 1/1975 | Schmidt | 250/480 |
| 3,870,889 | 3/1975 | Schmidt | 250/480 |
| 4,198,009 | 4/1980 | Turner | 378/187 |
| 4,444,484 | 4/1984 | Best et al. | 354/276 |

FOREIGN PATENT DOCUMENTS 0236164 7/1925 United Kingdom ................ 378/187

Primary Examiner—Janice A. Howell
Assistant Examiner—David P. Porta
Attorney, Agent, or Firm—William C. Dixon

[57] ABSTRACT

An improved photographic cassette in which the plate and screen adjacent the front cover on the tube side of the cassette is unsecured to the front cover; that is, free floating, thereby achieving more uniform sheet-to-plate contact throughout the entire area of the sheet. The cassette also has a pressure plate and means forming a part of the pressure relieving means for engaging and holding the floating plate against the front cover upon actuation of the cassette pressure relieving means. The floating plate engaging and holding means facilitates separation of the pressure and floating plates and unblocking of the cassette entry slot by the floating plate to allow a sheet to freely enter the slot.

10 Claims, 7 Drawing Sheets

PHOTOGRAPHIC CASSETTE AND METHOD OF DISPENSING

BACKGROUND OF THE INVENTION

1. Field of the Invention

The present invention relates generally to photographic cassettes, and particularly to an improved photographic cassette and method for improving performance capabilities of the cassette in normal and weight-bearing X-ray examination conditions, and for facilitating entry of a photographic sheet therein during cassette loading.

2. Description of the Prior Art

U.S. Pat. Nos. 3,784,835, 3,870,889 and 4,444,484 describe X-ray film sheet cassettes of the type suitable for day-light loading and unloading in cooperation with film supplying and film processing apparatus. Such cassettes typically have a rectangular solid configuration defined by six orthogonally joined walls which enclose a chamber for accommodating an X-ray film sheet. In one of those wall is a light-shielded slot through which a film sheet can pass into and out of the chamber. Within the chamber, in alignment with the slot, is a pair of opposing planar screened surfaces relatively movable toward and away from each other to prevent and permit, respectively, movement of the film sheet therebetween. One of those surfaces is forced by a spring or other means toward the other to clamp a film sheet between them. Means are provided for urging the two surfaces apart in response to placing the cassette into operative relationship with suitably configured film suppling or film processing apparatus, thereby allowing a film sheet to slide between those surfaces when the cassette is positioned for loading or unloading. When so positioned, the cassette is intended to be loaded or unloaded by the simple expedient of letting a film sheet drop into or out of the chamber by force of gravity.

Although the above-mentioned patents have means to clamp a film sheet between intensifier screen surfaces, one of the screens is secured to a movable pressure plate whereas the other screen is secured to the cassette cover facing the X-ray directing tube, normally referred to as the tube side of the cassette. A problem with such a cassette construction, particularly of the type shown in U.S. Pat. No. 4,444,484, is that when an external force is applied to the weight-bearing cassette cover by the weight of a portion of the patient's anatomy being X-rayed, such as an elbow, for example, the cover and screen secured thereto is bowed, as shown in exaggerated form in FIG. 9 of this application, resulting in good line film-to-screen contact at the center of the longitudinal length of the cassette, but a progressive loss in film-to-screen contact upon outward progression to the ends of the cassette. This loss in film-to-screen contact is due to the screen ends secured to the bowed cover withdrawing from the film as it is pressed toward the cover by the pressure applying means. This problem has been solved in part in U.S. Pat. No. 3,870,889 by constructing the cassette with a free-floating screen that is bowed and made non-floating or rigid by an elongated rib on the cover when the cassette is in a film-loaded position for exposure. This problem is solved by the present invention by constructing the cassette so that the screen adjacent the cover facing the X-ray machine is free-floating when the cassette is in a film-loaded position for exposure. By virtue of this cassette construction, good uniform film-to-screen contact, as illustrated in FIG. 8, is achieved throughout the entire area of the film for both normal and weight-bearing conditions.

SUMMARY OF THE INVENTION

An object of the present invention is to provide an improved photographic cassette having improved performance capability, particularly in a weight-bearing X-ray examination condition. The cassette has a slot at one end through which a sheet is movable therethrough along an inlet path, an opposite end, opposite sides joining the one end and opposite end, and opposing front and rear covers joined to the ends and sides. The cassette further comprises:

a pressure plate adjacent the rear cover;

an unsecured floating plate adjacent the front cover, the pressure and floating plates having substantially planar interior surfaces in substantially parallel, facing relationship with each other to support the sheet therebetween;

pressure applying means biasing the pressure plate toward the floating plate to press the sheet flat between the interior surfaces even when said front cover is deformed in a weight-bearing examination; and pressure relieving means actuatable to urge the pressure and floating plates apart and thereby relieve the sheet of pressure applied thereto by the interior surfaces, thereby allowing the sheet to enter the slot for succeeding movement along said inlet path.

Another object of the invention is to provide means forming a part of the pressure relieving means for engaging and holding the floating plate against the front cover upon actuation of the pressure relieving means to facilitate separation of the interior surfaces and unblocking of the slot by the floating plate, thereby allowing the sheet to freely enter the slot for succeding movement along the inlet path into the cassette.

Another object of the invention is to provide a method for improving performance capability of the aforementioned cassette in a weight-bearing examination. The method comprises the step of mounting the front plate to freely float on the front cover in unsecured relation, thereby achieving uniform sheet-to-plate contact throughout the entire area of the sheet during a weight-bearing examination.

Another object of the invention is to provide a method for facilitating introduction of a sheet into the aforementioned cassette of this invention. The method comprises the step of actuating the cassette pressure relieving means to concurrently urge the pressure plate against the pressure applying means and the floating plate against the front cover to positively separate the interior surfaces, thereby preventing inadvertent movement of the floating plate from partially blocking the slot and preventing the introduction of the sheet through the slot and into the cassette along the entry path during a cassette loading operation.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, wherein like reference numerals denote like elements, and wherein.

DESCRIPTION OF THE PREFERRED EMBODIMENTS

Because certain parts of photographic cassettes and related apparatus are well known, the following description is directed in particular to those elements forming, cooperating directly with, or relating to the present invention. Elements not specifically shown or described herein are selectable from those known in the art, particularly as shown in U.S. Pat. No. 4,444,484.

Figure 1:
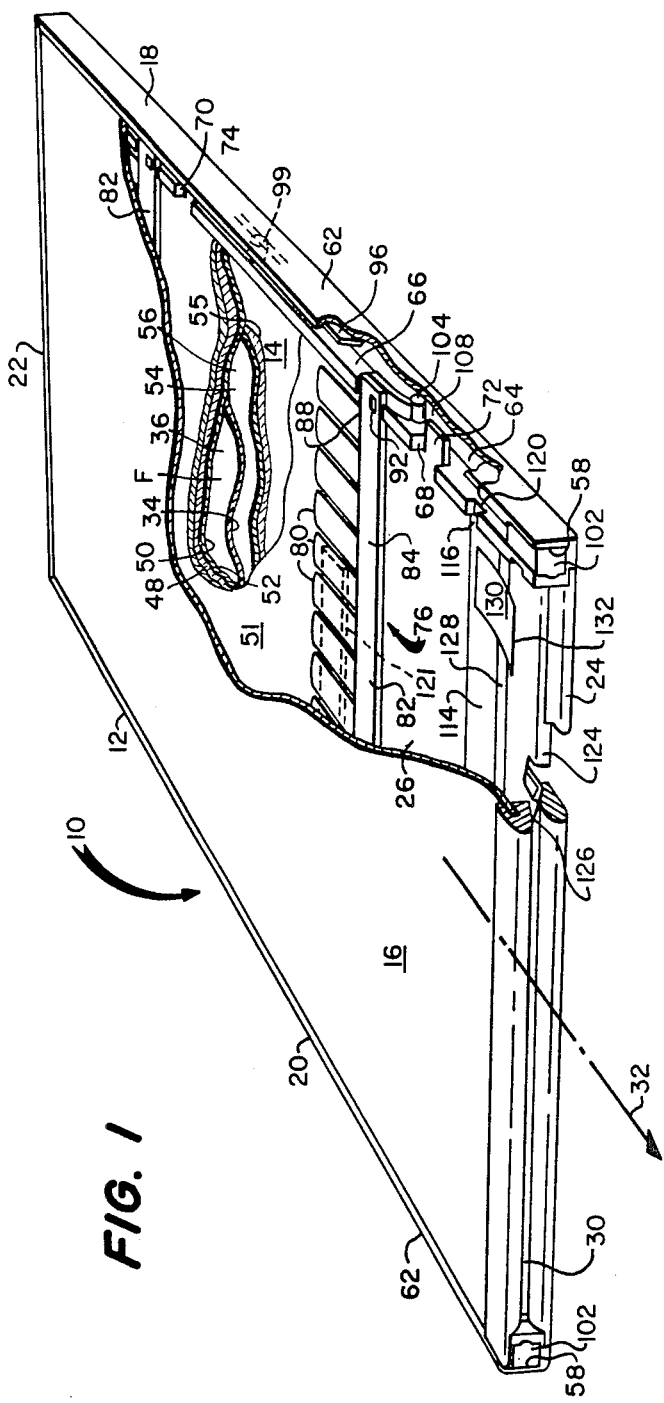
FIG. 1 is a perspective view, partly broken away, of a photographic cassette constructed in accordance with a preferred embodiment of the present invention.

Illustrated in FIG. 1 is a photographic cassette 10 designed to hold a film sheet F for exposure when positioned in operative relation to a source of X-ray radiation. The cassette includes a rectangular-solid-shaped housing 12 defined by six opaque walls 14, 16, 18, 20, 22, 24, which are joined as shown to enclose a chamber 26 for accommodating the film sheet. Opposing front and rear walls 14, 16, are spaced from and parallel with each other so that when the cassette is oriented for an exposure, front or tube wall 14 faces the radiation source and rear wall 16 lies behind the film sheet. Joined to front and rear walls 14, 16 are opposing side walls 18, 20 and opposing end walls 22, 24. End wall 24 has a light-shielded elongate opening or slot 30 therein through which the film sheet can pass along a film path 32 into and out of chamber 26.

Located inside housing 12, between and substantially parallel with front and rear walls 14, 16, is a pressure plate 48 made of magnesium or aluminum and mounted for movement toward and away from front wall 14. Secured to the front of plate 48 is a sheet-like intensifier screen 50 similar in size and shape to film sheet F and having a forward-facing, substantially planar surface 52.

Coated onto the rear of plate 48 is a layer of lead foil 51. Loosely placed onto the back of front wall 14 is a front floating plate 55 onto which a similar screen 54 is secured having a rearward-facing, substantially planar surface 56. Planar surfaces 52 and 56 thus face toward each other, so as to face opposite surfaces 34, 36 of film sheet F, when the film sheet is operatively disposed between the two screens.

As shown in FIG. 1, housing side walls 18, 20 are U-shaped in cross section, as a result of channels 58, 60, respectively, extending longitudinally therein from a closed end at wall 22 to an open end at wall 24. Although the following description refers only to features of and parts associated with channel 58, it will be understood that the same description applies to corresponding features of and parts associated with channel 60. Channel 58 may be viewed as bounded on three sides by outer, medial, and inner sections 62, 64, 66, respectively, of side wall 18. Spaced along inner section 66 are two rectangular cut-outs 68, 70 opening toward rear wall 16. Cut-outs 68, 70 are positioned and dimensioned to receive, loosely, a pair of tabs 72, 74 extending laterally from pressure plate 48, so as to locate plate 48 and screen 50 in registration with screen 54, and also guide movement of the plate and screen 50 toward and away from screen 54 as the tabs ride forward and rearward, respectfully, in the cut-outs.

Figure 2:
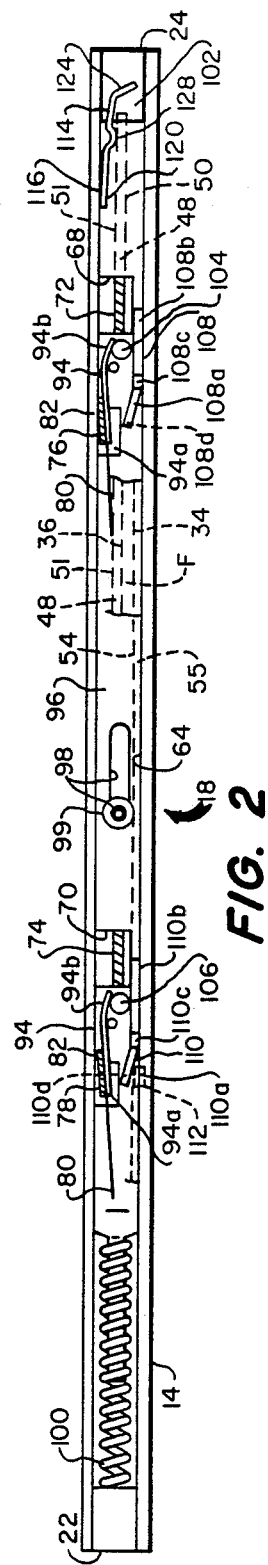
FIG. 2 is an interior view of a vertical section through a sidewall of the cassette of FIG. 1, showing various components as they are positioned when the cassette is closed.
Figure 3:
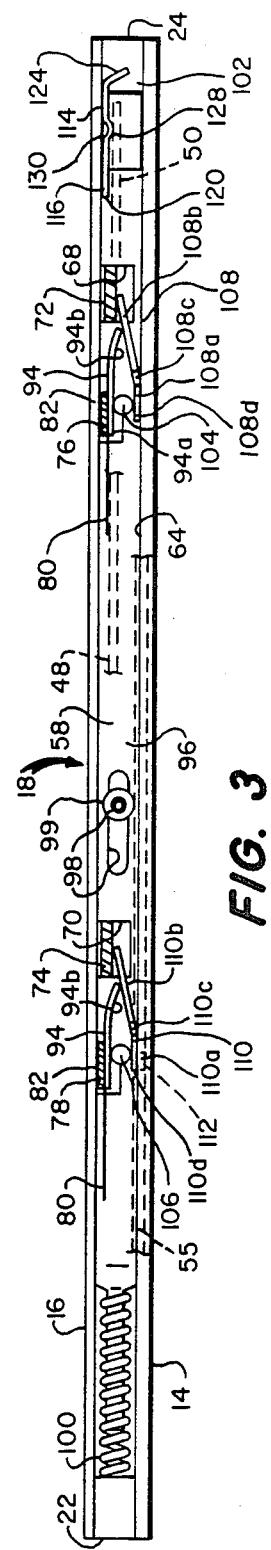
FIG. 3 is an interior view similar to FIG. 2 but showing the various components as they are positioned when the cassette is opened.

Biasing plate 48 forwardly, that is, toward front wall 14, is a pair of spring assemblies 76, 78 mounted between plate 48 and rear wall 16. Larger cassettes may have three or four such spring assemblies. Each spring assembly comprises a plurality of leaf springs 80 projecting longitudinally toward end wall 22 from a connecting bar 82 which extends transversely from side wall 18 to side wall 20. Each bar 82 may be bowed concave-forward/convex-rearward so that rear wall 16 presses forwardly on the middle portion 84 of each rod, thus tending to flatten the bow and thereby urge leaf springs 80 against the back of plate 48. The laterally extending end portions 86 of bar 82 is loosely received by a cut-out 88 provided in inner section 66, and is located therein by a small projection 90 on section 66 protruding rearwardly through a mating aperture 92 in end portion 86. End portion 86 terminates in a rocker arm 94 which lies perpendicular to rod 82 and projects longitudinally toward end wall 24 in registration with medial section 64. As shown in FIGS. 2 and 3, rocker arm 94 comprises two arms 94a, 94b which are joined to form a generally obtuse angle therebetween. Arm 94a is secured to the end of bar 82 and arm 94b projects from arm 94a toward end wall 24. Means are provided in channel 58 for rocking rocker arm 94, and with it the whole spring assembly, so as to decrease or increase the spring force biasing plate 48 toward front wall 14.

The above-mentioned rocking means comprises an elongate push bar 96 mounted, by means of a conventional pin-and-slot arrangement 98, for longitudinal sliding movement toward and away from end wall 24. To facilitate such movement, a spacing and guiding ruler 99 is rotatably mounted in channel 58 between bar 96 and inner section 66, as shown. Biasing bar 96 toward end wall 24 is a compression spring 100 disposed in channel 58 near end wall 22 and pushing against one end of the bar. Fixed to the opposite end of the bar is an actuator button 102, one of two which normally lies in the open end of channel 58 flush with end wall 24. Bar 96 thus can be moved away from end wall 24, toward end wall 22, by pushing upon button 102 with enough force to overcome the opposing biasing influence of spring 100.

Carried by bar 96 is a pair of rollers 104, 106 which are freely rotatable about axes substantially perpendicular to side wall 18. Rollers 104, 106 are positioned on bar 96 for cooperation with spring assemblies 76, 78 respectively. Larger cassettes having more than two spring assemblies would have a like number of rollers on bar 96 suitably positioned for cooperation therewith. In the normal, unactuated position of bar 96, shown in FIG. 2, wherein button 102 lies flush with end wall 24, rollers 104, 106 are located immediately beneath, and support, the free end arm 94b of each spring assembly. When button 102 is depressed so as to move bar 96 to its actuated position, shown in FIG. 3, rollers 104, 106 are moved out from under arm 94b, and into engagement with arm 94a of each spring assembly, thereby camming arm 94a toward, and 94b away from, rear wall 16. This motion of rocker arm 94 causes connecting bar 82 to pivot leaf springs 80 in a direction away from plate 48, so as to decrease the spring force biasing plate 48 toward front wall 14. Similarly, when the actuating force on button 102 is removed and bar 96 is returned by spring 100 to its normal position shown in FIG. 2, the rollers 104, 106 are moved out from under arm 94a, and into engagement with arm 94b, of each spring assembly, thereby camming arm 94b toward, and 94a away from, rear wall 16. This return motion of rocker arm 94 then causes connecting bar 82 to pivot the leaf spring back toward plate 48, so as to increase the spring force biasing plate 48 toward front wall 14.

Figure 5:
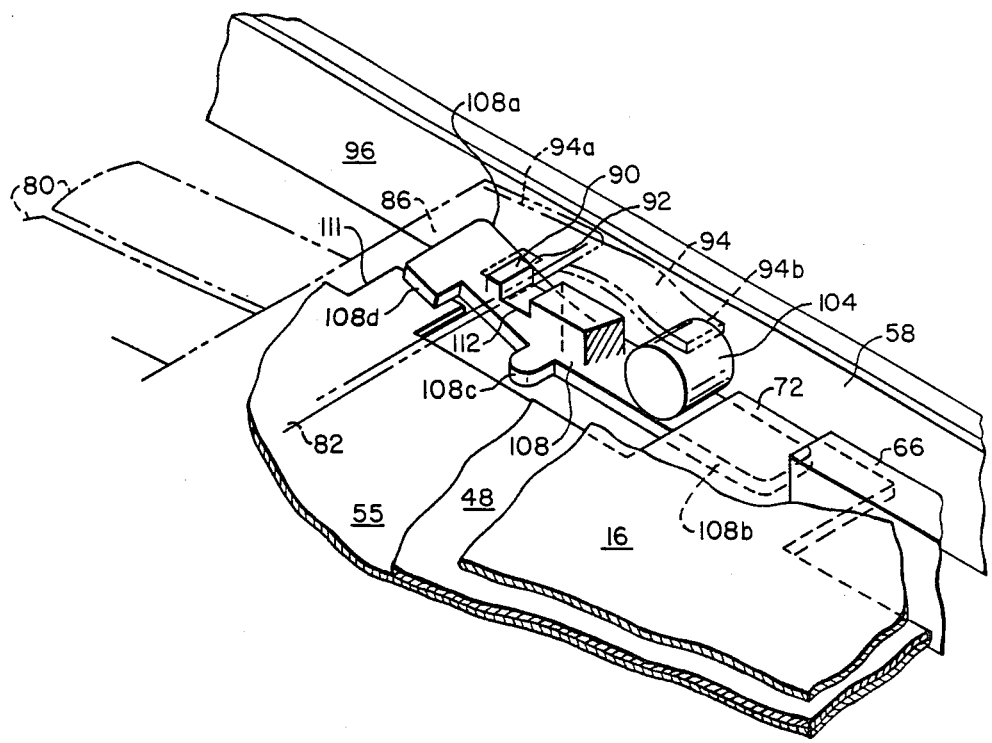
FIG. 4 and 5 comprise two partial perspective views revealing details of certain components positioned as shown in FIG. 2.
Figure 4:
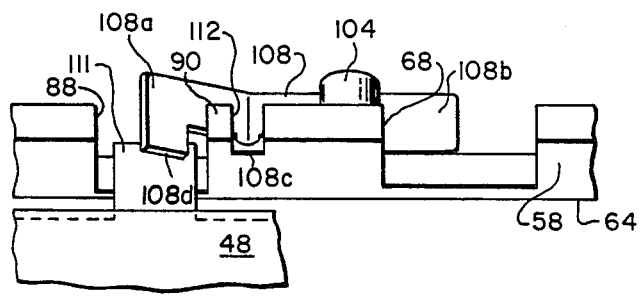

Spaced along medial section 64, in registration with the rocker arms 94 of spring assemblies 76, 78, the rollers 104, 106 and the tabs 72, 74 of plate 48, is a pair of bell crank levers 108, 110. It should be noted here that larger cassettes provided with more than two spring assemblies would have not only a like number of rollers on bar 96 but also the same number of tabs and as many bell crank levers registered therewith, as will become readily apparent from the description that follows. Because levers 108, 110 are identical in both structure and function, only lever 108 will be described. It should be understood, however, that lever 110 cooperates with roller 106 and tab 74 in the same manner as lever 108 cooperates with roller 104 and tab 72. Lever 108 comprises two longitudinally projecting arms 108a, 108b, which are joined to form an obtuse angle therebetween, and a laterally projecting tab 108c. As shown in FIG. 5, tab 108c is received by a mating cut-out 112 provided in inner section 66 to locate lever 108 so that arm 108a faces arm 94a while arm 108b faces both arm 94b and tab 72. In the normal, unactuated position of bar 96 shown in FIGS. 2 and 5, roller 104 bears upon the midsection of arm 108b so as to hold that arm down against medial section 64 while arm 108a projects angularly therefrom toward arm 94a. It will be noted that in this position of bar 96, roller 104 keeps arms 108b and 94b substantially parallel with each other and arms 108a and 94a converging toward each other. In this position, the spring assemblies acting upon the pressure plate keep the film sheet pressed flat between screens 50 and 54. By virtue of rectangular shims 121 secured to pressure plate 48 underneath the ends of a center section of leaf springs 80, as seen dotted in FIG. 1, the pressure applied to the film sheet is increased under this center section so that the film pressure laterally across the cassette is more uniform.

Figure 6:
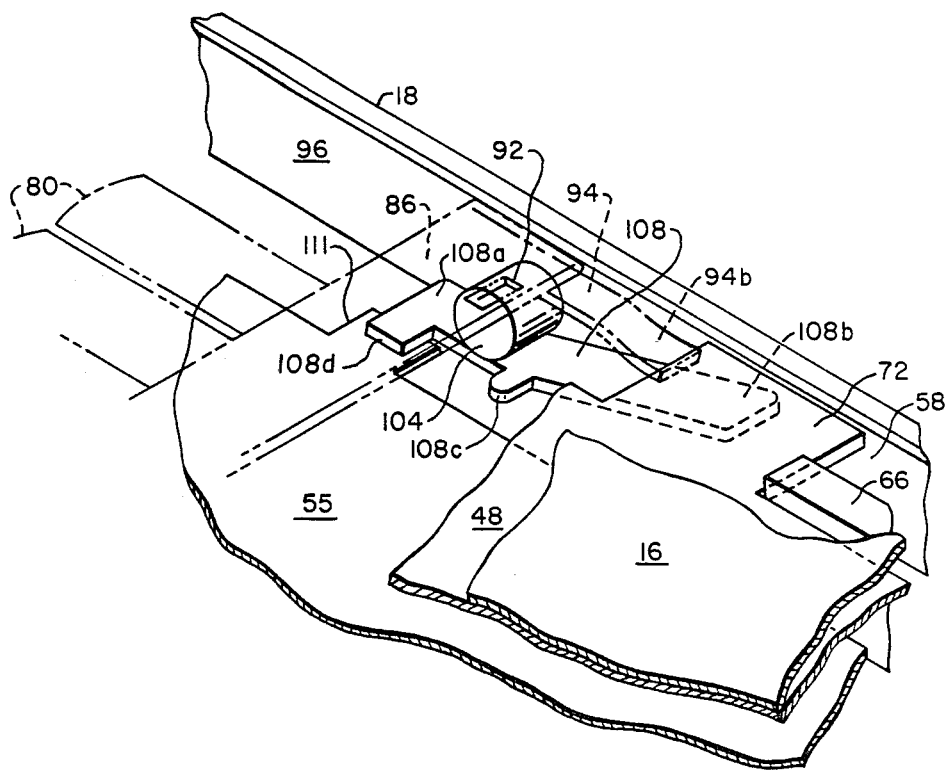
FIG. 6 is a partial perspective view similar to FIG. 5 but showing the components as positioned in FIG. 3.
Figure 7:
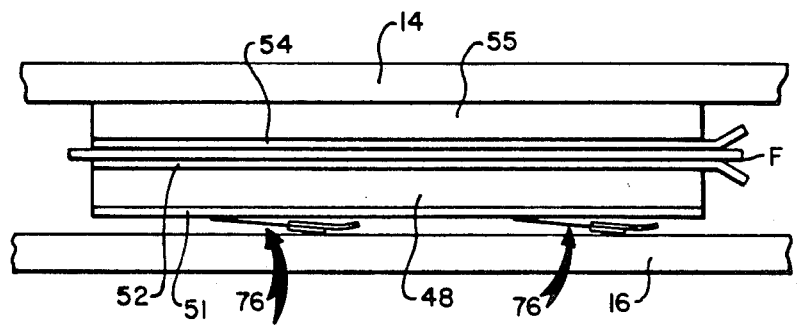
FIG. 7 is a diagramatic view in exaggerated form showing a stack of the main cassette components as they are positioned when the cassette is closed.
Figure 8:
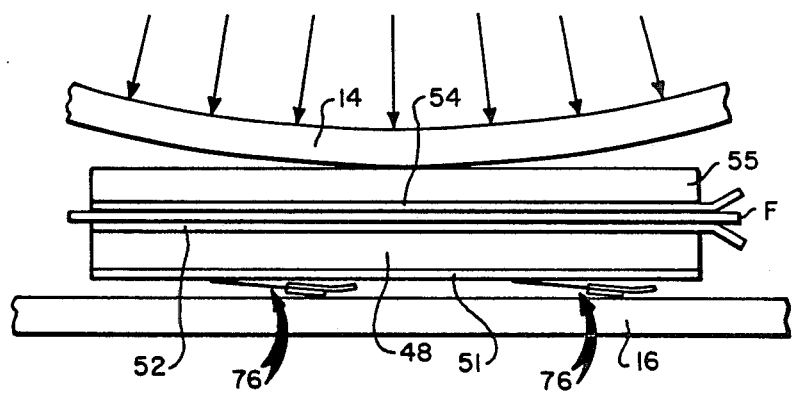
FIG. 8 is a view similar to FIG. 7 showing the stack of components of the present invention as they are positioned when the cassette is closed and subjected to weight in a weight-bearing exposure.
Figure 9:
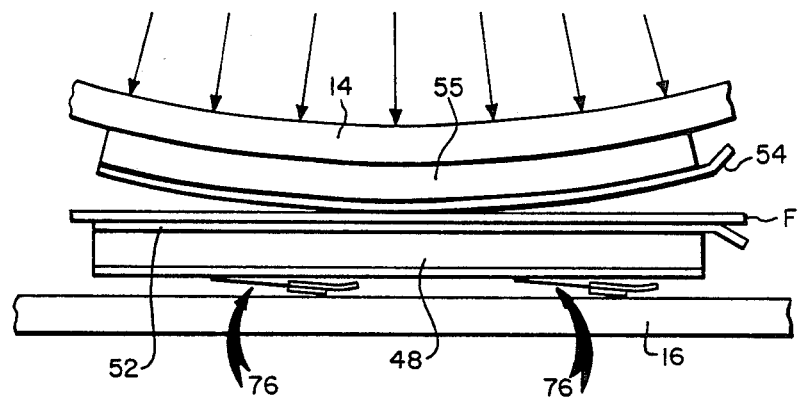
FIG. 9 is a view similar to FIG. 7 showing a prior art stack of components as they are positioned when the cassette is closed and subjected to weight in a weight-bearing exposure.

As bar 96 is pushed to its actuated position shown in FIGS. 3 and 6, roller 104 is moved both from under arm 94b and out from over arm 108b, and then into engagement with both arms 94a and 108a, thereby camming arms 94a and 108a away from each other and arms 94b and 108b toward each other. As explained above, such motion of rocker arm 94 tends to unload the spring force upon the pressure plate. The simultaneous motion of bell crank lever 108 causes upward-swinging arm 108b thereof to engage and lift tab 72, and a lug 108d on downward-swinging arm 108a to engage and lower ears 111 on floating plate 55, thereby separating pressure plate 48 and screen 50 from floating plate 55 and screen 54. Ears 111 extend laterally outwardly from opposite sides of floating plate 55, through corresponding cut-outs 112, shown dotted in FIGS. 2 and 3, in inner section 66. In this position of bar 96, therefore, the two screens are spread apart, and the film sheet between them is thus relieved of the spring pressure previously applied to it by the pressure plate. Also, floating plate 55 is held tight against front cover 14 by the lugs 108d and ears 111 interengagement, and prevented from twisting when manual force or the like is inadvertently applied to the cassette during loading thereof. Such twisting of the cassette could cause an end of floating plate 55 to twist and obstruct slot 30, thereby preventing entry of a sheet into the cassette.

Referring again to FIGS. 1, 2 and 3, near end wall 24 and extending parallel therewith from side wall 18 to side wall 20 is a light shield 114 configured and disposed to shield the film sheet from any light that might enter chamber 26 through slot 30. Shield 114 is rockably mounted between plate 48 and rear wall 16 with a tab 116 projecting laterally from each end thereof loosely received by mating cut-out 120 in the inner section 66 of each side wall. Shield 114 has a lip 124 which projects angularly and forwardly toward a groove 126 adjacent to slot 30, and a rib 128 which protrudes from the front of shield 114 toward plate 48. Secured to and projecting from the rear of shield 114 are two or more leaf springs 130 (only one shown), each having a free end portion 132 extending angularly toward and bearing resiliently upon rear wall 16, so as to bias shield 114 in a direction toward front wall 14. In the normal, unactuated position of bar 96 shown in FIGS. 1 and 2, wherein plate 48 and screen 50 hold the film sheet flat against screen 54 and plate 55, springs 130 keep shield 114 in its forward, light-shielding position wherein lip 124 is held in groove 126 so as to block passage of any light through slot 30. In this condition, the cassette is said to be closed. When bar 96 is actuated to urge plate 48 in screen 50 away from plate 55 and screen 54, as shown in FIG. 3, the rear of plate 48 engages rib 128 and pushes shield 114 rearwardly, against the biasing influence of springs 130, until lip 124 has left groove 126 and cleared slot 30, thereby allowing the film sheet to move out from between screens 50 and 54, toward end wall 24 past shield 114, and thence through slot 130. In this condition, the cassette is said to be open.

Figure 10:
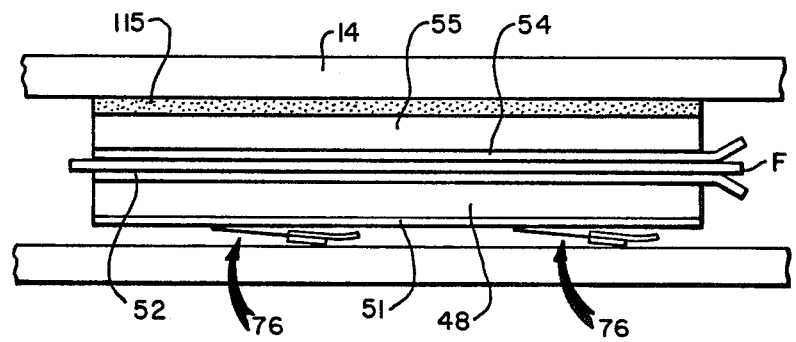
FIG. 10 is a view similar to FIG. 7 showing the stack of cassette components of another embodiment of this invention.

With reference to FIG. 10, another embodiment of the invention is illustrated in which a sheet 115 of plastic foam material or the like is interposed between front cover 14 and front floating plate 55.

Figure 11:
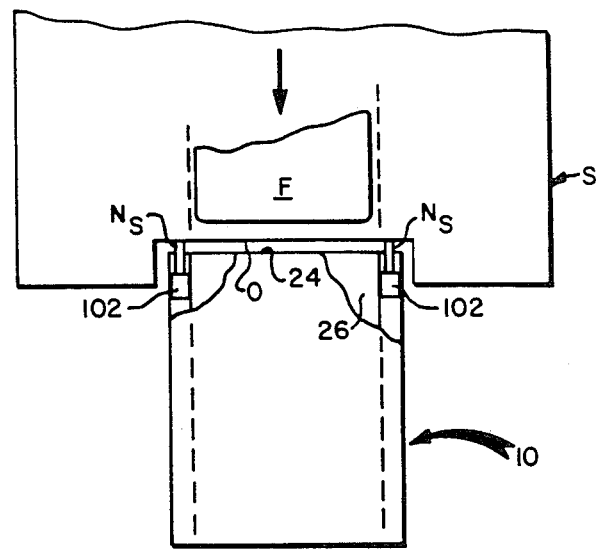
FIG. 11 is a schematic view of the cassette of FIG. 1 disposed in cooperative relationship with a film-supplying apparatus.
Figure 12:
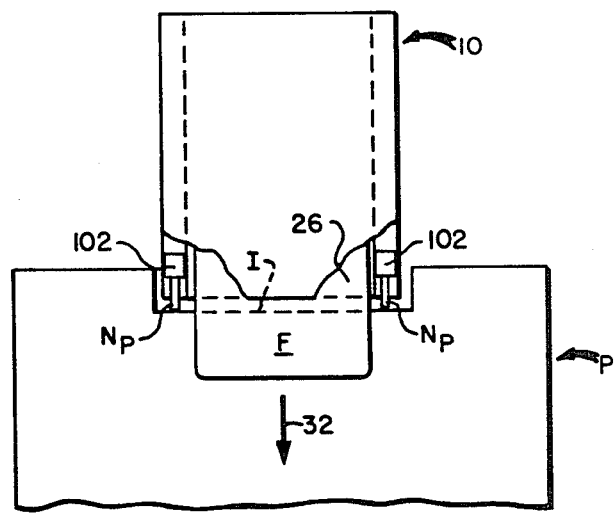
FIG. 12 is a schematic view similar to FIG. 11 but showing the cassette in cooperative relationship with a film-processing apparatus.

In operation, as depicted schematically in FIG. 11, the cassette first is loaded with a film sheet F by positioning the cassette in cooperative relationship with suitably configured film supplying apparatus S. When so positioned, end wall 24 is joined in light-tight relation to such apparatus so that slot 30 is aligned with a film sheet outlet 0 thereon and buttons 102 are aligned with a pair of actuating pins Ns adjacent to the outlet. When the cassette and apparatus are thus joined, the outlet is opened, buttons 102 are engaged and depressed by the pins so as to urge bars 96 to their actuated positions, and the film sheet is caused to move in the direction of the arrow from within the apparatus, through the outlet and now-opened slot 30, to its operative position in chamber 26 between now-separated screens 50 and 54. When loading has been accomplished, the cassette is removed from the supplying apparatus with slot 30 closed and film sheet F held flat between the two screens, both conditions resulting from the return of bars 96 to their normal positions. The cassette is then ready for use with X-ray exposing apparatus (not shown) to obtain a desired X-ray photograph. After the film sheet has been exposed and is to be removed from the cassette for processing, as depicted schematically in FIG. 12, the cassette is positioned in cooperative relationship with suitably configured film processing apparatus P. When so positioned, the cassette is oriented vertically with its end wall 24 facing downward and joined in light-tight relation to the apparatus so that slot 30 is aligned with a film sheet inlet I thereon and buttons 102 are aligned with a pair of actuating pins adjacent to the inlet. When the cassette and apparatus are thus joined, the inlet is opened and buttons 102 are engaged and depressed by the pins so as to move bars 96 to their actuated positions, wherein screens 50 and 54 are spread apart and slot 30 is open for passage of the film sheet into the processing apparatus.

The invention has been described in detail with particular reference to preferred embodiments thereof, but it will be understood that variations and modifications can be effected within the spirit and scope of the invention.

What is claimed is:

1. An improved X-ray cassette having improved performance capability in a weight-bearing examination condition, the cassette having one end with a slot therein through which a sheet is movable therethrough along an inlet path, an opposite end, opposite sides joining said one end and opposite ends, and opposing front and rear covers joined to said ends and sides, the combination comprising:
    a pressure plate adjacent said rear cover;
    an unsecured floating plate adjacent said front cover, said pressure and floating plates having substantially planar interior surfaces in substantially parallel, facing relationship with each other to support the sheet therebetween;
    pressure applying means biasing said pressure plate towards said floating plate to press the sheet flat between said interior surfaces even when said front cover is deformed in a weight-bearing examination; and
    pressure relieving means actuatable to engage each of said pressure and floating plates for urging said pressure and floating plates apart to relieve the sheet of pressure applied thereto by said interior surfaces, thereby allowing the sheet to enter said slot for succeeding movement along said inlet path.

2. A cassette according to claim 1 and further comprising means forming a part of said pressure relieving means for engaging and holding said floating plate against said front cover upon actuation of said pressure relieving means to facilitate separation of said interior surfaces and unblocking of said slot by said floating plate.

3. A cassette according to claim 2 wherein said pressure relieving means comprises a pivotally mounted shallow V-shaped spring lever along each of said opposite sides, and a reciprocally movable cam slidable over each of said spring levers between a normal pressure applying position, in which said cam depresses one end of said spring lever and actuates said pressure applying means to bias said pressure plate toward said floating plate, and a pressure relieving position, in which said cam relieves said pressure applying means and depresses the opposite end of said spring lever causing said one end of said spring lever to engage and urge said pressure plate toward said rear cover; and said engaging and holding means comprises a lug on said opposite end of said spring lever for engaging and holding said floating plate against said front cover when said cam is in its pressure relieving position.

4. A cassette according to claim 3 wherein said floating plate has laterally extended ears engagable by said lugs on said spring levers.

5. A cassette according to claim 4 wherein a pair of spaced spring levers are mounted along each of said opposite sides, and each of said spring levers has a lug on said opposite end thereof for engaging corresponding ears on said floating plate.

6. A cassette according to claim 1 wherein said pressure applying means comprises a spring assembly extending transversely between said opposite sides, and an elongate shim parallel to said spring assembly and interposed between the center portion of said spring assembly and said pressure plate to assure that the entire sheet area is positively engaged by said opposing interior surfaces.

7. A cassette according to claim 6 wherein said spring assembly comprises a flat bar extending between said opposite sides, and a plurality of leaf springs projecting from said bar longitudinally toward said opposite end of said cassette, and said shim is affixed to said pressure plate below and in alignment with the center portion of said leaf springs.

8. A method for improving performance capability of a cassette in a weight-bearing examination, the cassette having one end with a slot therein through which a sheet is moved therethrough along an inlet path, an opposite end, opposite sides joining said one and opposite ends, opposing front and rear covers joined to said ends and sides, a pressure plate adjacent said rear cover, a front plate adjacent said front cover, said pressure and front plates having substantially planar interior surfaces in substantially parallel, facing relationship with each other to support the sheet therebetween, pressure applying means baising the pressure plate toward the front plate to press the sheet flat between the interior surfaces, and pressure relieving means actuatable to engage each of said pressure and front plates for urging said pressure and front plates apart to relieve the sheet of pressure applied thereto by the interior surfaces, said method comprising the step of:
    mounting said front plate to freely float on said front cover in unsecured relation, thereby achieving uniform sheet-to-plate contact throughout the entire area of the sheet during a weight-bearing examination.

9. A method according to claim 8 wherein the cassette further has means forming a part of the pressure relieving means for engaging and holding the floating front plate against the front cover upon actuation of the pressure relieving means, said method comprising the further step of:

actuating said pressure relieving means to concurrently urge said pressure plate toward said rear cover and said front floating plate against said front cover to positively separate said interior surfaces, thereby preventing inadvertent movement of said floating plate from partially blocking said slot and preventing the introduction of the sheet through the slot and into the cassette along the entry path.

10. A method according to claim 9 wherein said actuating step involves concurrently applying a force in one direction against said pressure plate, and applying another force in the opposite direction against said front floating plate.

* * * * *